United States Patent
Collis et al.

(10) Patent No.: US 10,245,792 B2
(45) Date of Patent: Apr. 2, 2019

(54) METHODS AND SYSTEMS FOR BONDING

(71) Applicant: Rolls-Royce PLC, London (GB)

(72) Inventors: Andrew Collis, Derby (GB); Nolan Richmond, Derby (GB)

(73) Assignee: Rolls-Royce PLC, London (GB)

(*) Notice: Subject to any disclaimer, the term of this patent is extended or adjusted under 35 U.S.C. 154(b) by 0 days.

(21) Appl. No.: 15/568,337

(22) PCT Filed: Apr. 26, 2016

(86) PCT No.: PCT/GB2016/051171
§ 371 (c)(1),
(2) Date: Oct. 20, 2017

(87) PCT Pub. No.: WO2016/174412
PCT Pub. Date: Nov. 3, 2016

(65) Prior Publication Data
US 2018/0111332 A1    Apr. 26, 2018

(30) Foreign Application Priority Data
Apr. 29, 2015    (GB) .................................. 1507281.2

(51) Int. Cl.
*B32B 41/00* (2006.01)
*B29C 65/00* (2006.01)
(Continued)

(52) U.S. Cl.
CPC ........ *B29C 66/92211* (2013.01); *B29C 65/48* (2013.01); *B29C 65/782* (2013.01);
(Continued)

(58) Field of Classification Search
CPC ......... B29C 66/92211; B29C 66/73112; B29C 66/1122; B29C 66/301; B29C 66/742;
(Continued)

(56) References Cited

U.S. PATENT DOCUMENTS

| 5,385,050 A | 1/1995 | Roberts |
| 2008/0110275 A1 | 5/2008 | Odendahl |

(Continued)

FOREIGN PATENT DOCUMENTS

WO    WO-03/036612 A1    5/2003

OTHER PUBLICATIONS

International Patent Application No. PCT/GB2016/051171, International Search Report and Written Opinion dated Jul. 5, 2016, 11 pgs.

(Continued)

*Primary Examiner* — Michael N Orlando
*Assistant Examiner* — Joshel Rivera
(74) *Attorney, Agent, or Firm* — Schwegman Lundberg & Woessner, P.A.

(57) ABSTRACT

Methods and apparatus are described for improving fit checking at the bonding interface of a first component, such as a fan blade (1), and a second component, such as an edge guard (2) for the fan blade (1), to be bonded by adhesive. A bondline thickness profile over the area of the bonding interface is determined by interposing a compressible, flexible sensor layer between the components before they are bonded. The sensor layer contains an array of piezoelectric elements which indicate local bondline thickness by signalling pressure due to compression of the layer. The bondline thickness profile can be processed by a programmed control processor to produce an adhesive application schedule prescribing the shapes of pieces of adhesive film which, when applied over the bonding interface, will build up an adhesive layer corresponding in thickness to the bondline thickness. The sensor layer can be prepared as a kit of shaped panels or as a contoured preform (55) matching the form of the bonding interface.

20 Claims, 4 Drawing Sheets

(51) Int. Cl.

| | | |
|---|---|---|
| B29C 65/48 | (2006.01) | |
| B29C 65/78 | (2006.01) | |
| F16B 11/00 | (2006.01) | |
| F01D 5/14 | (2006.01) | |
| F01D 5/28 | (2006.01) | |
| F01D 17/02 | (2006.01) | |
| G01B 7/16 | (2006.01) | |
| G01B 7/287 | (2006.01) | |
| G01L 1/20 | (2006.01) | |
| G01B 7/28 | (2006.01) | |
| G01L 1/16 | (2006.01) | |
| B29L 31/08 | (2006.01) | |

(52) U.S. Cl.
CPC ........ *B29C 66/1122* (2013.01); *B29C 66/301* (2013.01); *B29C 66/346* (2013.01); *B29C 66/532* (2013.01); *B29C 66/721* (2013.01); *B29C 66/73112* (2013.01); *B29C 66/742* (2013.01); *F01D 5/147* (2013.01); *F01D 5/282* (2013.01); *F01D 17/02* (2013.01); *F16B 11/006* (2013.01); *G01B 7/22* (2013.01); *G01B 7/285* (2013.01); *G01B 7/287* (2013.01); *G01L 1/16* (2013.01); *G01L 1/205* (2013.01); *B29L 2031/082* (2013.01); *F05D 2220/36* (2013.01); *F05D 2230/23* (2013.01); *F05D 2230/31* (2013.01); *F05D 2260/407* (2013.01); *F05D 2260/83* (2013.01)

(58) Field of Classification Search
CPC ..... B29C 65/48; B29C 65/782; B29C 66/346; B29C 66/721; B29C 66/532; G01L 1/16; G01L 1/205; G01B 7/285; G01B 7/287; G01B 7/22; F01D 5/147; F01D 5/282; F01D 17/02; F16B 11/006; F05D 2230/31; F05D 2230/23; F05D 2260/83; F05D 2260/407; F05D 2220/36; B29L 2031/082
USPC .................. 156/64, 350, 351, 368, 378, 379
See application file for complete search history.

(56) References Cited

U.S. PATENT DOCUMENTS

| | | |
|---|---|---|
| 2009/0151454 A1 | 6/2009 | Georgeson et al. |
| 2013/0220032 A1* | 8/2013 | Packirisamy .......... G01B 11/18 73/862.624 |

OTHER PUBLICATIONS

United Kingdom Patent Application No. 1507281.2, Search Report dated Nov. 4, 2015, 3 pgs.

* cited by examiner

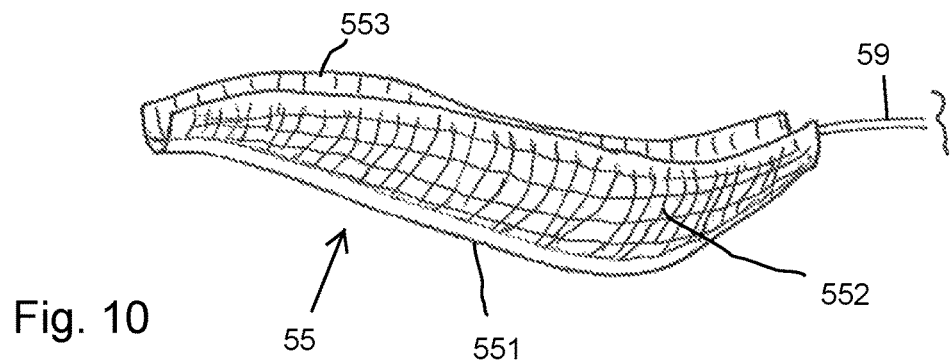
Fig. 10
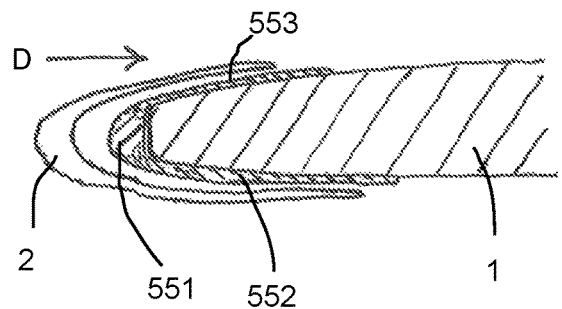
Fig. 11
Fig. 12
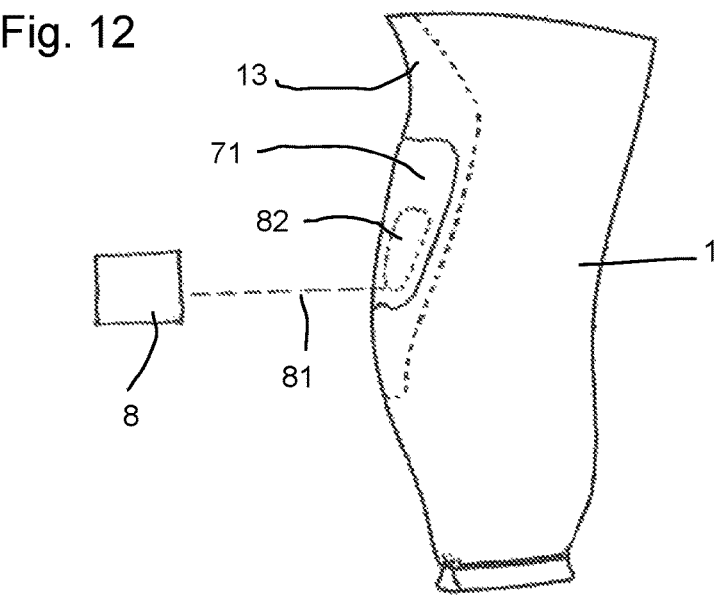

METHODS AND SYSTEMS FOR BONDING

This application is a U.S. National Stage Filing under 35 U.S.C. 371 from International Application No. PCT/GB2016/051171, filed on Apr. 26, 2016, and published as WO 2016/174412 A1 on Nov. 3, 2016, which claims the benefit of priority under 35 U.S.C. § 119 to United Kingdom Patent Application No. 1507281.2, filed on Apr. 29, 2015, each of which is hereby incorporated by reference herein in its entirety.

This invention relates to methods for joining components by adhesive bonding, and to systems and equipment useful for these methods. We particularly envisage application in the field of joining fibre-reinforced composite components to one another and/or to metal components, especially aerospace components. The methods described are also useful in general fit checking such as in the quality control of shaped components for bonding. Systems for implementing the methods are an aspect of the invention.

BACKGROUND

Adhesive bonding is widely used in the aerospace industry and in other fields for joining fibre-reinforced composite components to one another and to metal components. A wide variety of aerospace structural parts such as rotor blades, wings, struts, fan case liners and the like incorporate bonded joints between components. By eliminating or reducing the use of mechanical fasteners, adhesive bonding provides a number of known advantages.

To achieve adhesive bonds providing satisfactory performance and reliability under demanding conditions of use requires not only appropriate selection of adhesive type, surface preparation and the like, but also careful attention to the exact fit of the surfaces being joined. This is particularly important when bonding complementary surfaces of complex three-dimensional shape. It is important that in the eventual joint the gap between the component surfaces at the bonding interface, corresponding to the thickness of a layer of adhesive between them (bondline thickness) is not excessive, or a region of insufficient bond strength may result. Conversely, any actual contact between the components not only loses adhesion at the contacting regions and inhibits adhesive flow but may also hold the components apart at neighbouring regions which would otherwise fit properly. Achieving bondline thickness within a desired range all over the bonding interface is particularly important where exceptional operational stresses are to be expected, or where the components have different degrees of thermal expansion. Another issue particularly relevant for fibre-reinforced composite materials is slight non-smoothness or non-flatness of the composite surface after cure. Especially when one such component is to be bonded to another also having a range of dimensional tolerance, non-uniformities can coincide to take the bondline thickness outside the desired or permissible range.

For these reasons among others, especially with high-value high-performance components, it is conventional to go through a series of fit check procedures before adhesive is actually applied to both surfaces. In a known procedure a first layer of solid (film) adhesive is applied to one component over the bonding interface, covered by a release film, the shaped component surfaces are offered up together to a predetermined relative datum position and then separated. The test film indicates, by a transparency/colour change, regions where the adhesive layer has contacted both surfaces. Further protected adhesive layers are applied at the non-contacting regions and the process repeated, gradually building up a pattern or profile of adhesive layer thickness corresponding to the bondline thickness profile over the interface. Because of the crude sensitivity of the film test (contact or non-contact, without knowledge of the actual remaining clearance) it is impossible to gauge precisely the correct amount and area of additional adhesive, inevitably leading to inexact filling of the bondline; perhaps only 80% by volume. Corresponding iterative non-adhered fit checking of the components may also be needed before any adhesive is applied, to identify surface regions with excessive or inadequate spacing. These regions are reshaped and the procedure repeated until spacing all over the bonding interface is predicted to be within permissible ranges and the adhesive can be applied.

This process is therefore extremely laborious and time-consuming. It would be desirable to provide a more efficient and convenient procedure, and a procedure enabling improved adhesive fill accuracy at the bondline.

THE INVENTION

We now propose a new bonding method for joining first and second components by adhesive bonding at a bonding interface defined by respective complementary bonding faces of the first and second components, and in which the method includes a pre-bonding fit check in which the components are arranged in the intended bonding position to check the closeness of fit between them over the bonding interface.

According to our proposal the fit check comprises bringing the components together in the intended bonding position with a flexible, compressible spacing sensor layer between their bonding faces, thereby compressing the sensor layer according to the bondline thickness (i.e. the spacing between the faces) at different regions of the bonding interface, and sensing the degree of compression at the different regions to obtain a bondline thickness profile for the bonding interface. The bondline thickness profile, which is desirably created and stored electronically, is in effect a map of the bondline thickness over the bonding interface. The bondline thickness profile is then used to determine an adhesive application schedule which determines the quantities of adhesive to be applied to the respective regions. The adhesive application schedule—which again is preferably made and stored electronically—may for example be input to a cutter control processor programmed to determine the shapes of a set of adhesive film pieces which can be applied to one or both components at the bonding interface to build up an adhesive layer with an adhesive thickness profile corresponding to the predetermined bondline thickness profile.

We particularly prefer that the sensor layer is operable to measure variations in pressure at the respective interface regions, over a range of pressures arising from the different degrees of compression of the sensor layer between the component faces according to their varying spacing. Thus, a particularly preferred implementation is a sensor layer comprising an array of pressure sensors, preferably piezoelectric sensors. The sensors of the array typically have electrical or other connectors to an external processing unit for recording the bondline thickness profile.

By measuring pressure progressively over a range at many locations or regions, the pressure sensor layer can directly indicate quantitative bondline thickness variations over the interface, and this can be much more efficient than the previous repeated contact/non-contact tests.

Preferably the uncompressed sensor layer is at least as thick as a predetermined maximum bondline thickness (i.e. the largest thickness of adhesive layer regarded as acceptable for the components and adhesive in question) so that thickness measurement is achieved all over the interface. A sensor layer region detecting no compression indicates potentially unacceptable non-conformity of the component faces at that region, so that they should be separated, re-shaped and fit checked again before re-determining and using a bondline thickness profile. In contrast a bondline thickness much less than the maximum bondline thickness, indeed approaching actual contact, may be acceptable in many cases. So, the sensor layer is desirably susceptible of a substantial degree of compression, e.g. compressible at least down to 20% and more preferably at least down to 10% of its rest condition thickness. The sensor layer should preferably be able to undergo this compression and subsequently recover resiliently, i.e. without damaging or destroying the compression sensors e.g. pressure sensors such as piezoelectric sensors.

The desired rest thickness of the sensor layer will depend on the specific application (the material and form of the components, type of adhesive) but usually it is at least 0.5 mm, preferably at least 0.8 mm, more preferably at least 1 mm and perhaps 1.5 mm or more, while usually not more than 2 mm. Usually it is recoverably compressible at least down to 0.3 mm, preferably at least down to 0.2 mm, more preferably at least down to 0.1 mm. The % degrees of resilient compressibility referred to above can also be applied in relation to any of these preferred absolute thicknesses.

A preferred form of the sensor layer comprises a sensor sheet carrying an array of pressure sensors e.g. piezoelectric sensors, and an extender layer laminated on one or both faces of the sensor sheet, the extender layer total thickness desirably being greater of that of the sensor sheet and the extender layer material being softer (more easily compressed as a layer) than that of the sensor sheet. Desirably the extender layer material constitutes at least 60%, at least 70% or at least 80% of the total sensor layer thickness. These extended constructions of the sensor layer have the benefit of being able to support the sensors and desirably any associated wiring stably in a less-soft material. The soft extender layer builds the thickness out to the maximum bondline thickness so that progressive compression can be detected up to that thickness while still allowing the sensor layer to compress enough to survive close approach of the component surfaces at other regions.

Pressure-sensitive sheets comprising an array of piezoelectric sensors and associated connectors mounted in a stable rectangular carrier film are available products, as is the software for converting their sensor outputs into a pressure map display. Such equipment is available for example from Tiedemann & Betz GmbH & Co. KG. The conventional uses of these films are to detect patterns of pressure variation as such, rather than for measuring patterns of compressive deformation corresponding to a pattern of layer thickness changes. This known sensor sheet technology can be adapted and extended for the present purposes to produce pressure profiles or maps which can be displayed and/or further processed by appropriate programming.

Preferably the sensor layer is not substantially stretched in its layer direction when positioned between the components, because this would tend to reduce its thickness and change the relation between the compression (thickness) and detected pressure. Accordingly, when the bonding interface is three-dimensionally shaped, it is preferred that the sensor layer be preformed or patterned to accommodate that three-dimensional shape. This may be done by any film-working method which generally preserves or produces a substantially uniform layer thickness. Most simply the sensor layer is provided as multiple panels, each of which may be flat or substantially flat in its rest condition, with an outline corresponding to a selected relatively flat region of the bonding interface.

Alternatively stated, separate panels are provided for regions to either side of angles or edges of the interface, or at least the sharpest or most complex of these. The panels may be used separately or joined by connector portions, generally without sensor capability, to assemble a three-dimensional form or a form foldable to cover the three-dimensionally formed interface. By using a flexible and drapable material for the sensor layer or panels thereof, additional conformability is available.

Alternatively in some embodiments the sensor layer itself may be formed in three dimensions, e.g. by cutting to a pattern and joining layer portions edge-to-edge by bonding or welding to create the desired three-dimensional form of the sensor layer (sensor layer preform), or by using a hot-forming or moulding and setting process to form the sensor sheet preform.

The bonding interface is usually shaped or contoured in three dimensions because it is particularly in these cases that the determination of bondline thickness can be problematic. The bonding interface is preferably progressively curved in more than one plane. The second component may have a recess comprised in or constituting its bonding face and receiving a correspondingly projecting bonding face or bonding face portion of the first component. For example the second component may be in the form of a channel, cover or sheath having an interior recess bonding face fitting on to a complementary outer edge bonding face of the first component.

The method is particularly useful when one or both components is or comprises fibre-reinforced composite. The first component may be a blade, vane or other aerofoil element, preferably of fibre-reinforced polymer composite. The second component may be an edge cover or edge guard for it, preferably of metal. An example is a metal, e.g. titanium or titanium alloy, edge guard for a fan blade, rotor blade or vane in a ducted fan gas turbine engine.

Thus a preferred embodiment of our proposals is a bonding method for joining a metal edge cover onto a fibre-reinforced composite blade edge. The cover is in the form of a channel, with an interior recess bonding face usually deeper than it is wide. Direct shape measurement of such a bonding face, i.e. the surface of the interior recess, is very difficult so that the present method offers significant advantages. A sensor layer preform is prepared comprising an array of pressure sensors as described above, and in a channel form corresponding to the internal recess of the metal edge component. The metal edge is fitted onto the blade edge with the sensor layer preform between them. The edge and blade are moved together until they reach the predetermined bonding position. Reaching the bonding position may be indicated by the fitting abutment of predetermined location points (datum points) on the two components which are outside the bonding interface so that they can directly abut e.g. one at a tip end and one at a root end of the metal edge cover. The sensor layer preform occupies the entire bonding interface between the edge and cover, and is compressed to varying degrees between them according to the thickness of the interfacial gap (bondline thickness). The respective sensors of the sensor layer, distributed over the interface, detect correspondingly varying degrees of pressure which are communicated to the sensor layer's data processor. The pressure data for the array are converted to corresponding bondline thickness values. These data in turn are converted to a corresponding adhesive application schedule for the bonding interface. The bondline thickness profile is thus interpreted or converted according to appropriate algorithms which can be determined using ordinary programming and processing, to provide an adhesive application schedule program/scheme.

Another envisaged embodiment of the method is for bonding a fan case liner around the inside of a fan case for a gas turbine engine. These are two large annular components, usually both of fibre-reinforced composite, and the outside of the liner is to be bonded around the inside of the case. The radial gap at the bonding interface (bondline thickness) is desirably up to e.g. 1.5 mm. In the previous embodiment of a blade/vane and edge metal cover trim a preferred bondline thickness is usually smaller e.g. from 0.2 mm to 1 mm, although the minimum value is not critical provided that direct contact is avoided.

Depending on the size, complexity and nature of the components the sensor layer (or sensor layer preform) may extend over only a portion of the bonding interface and/or more than one sensor layer or preform may be used at respective regions of the bonding interface, e.g. because the interface is large or complex in shape. Establishment of the intended bonding position by the above-described means of abutting and/or interfitting location points (datum points) outside the bonding interface is generally applicable.

The necessary or desirable positional resolution, e.g. area density of pressure sensors in the sensor layer, depends on the complexity of the interface shape. The area density may vary over the layer if the shape has particularly complex or critical portions. Desirably the number of sensors in the layer is at least 100, preferably at least 500 or at least 1000.

The adhesive application schedule or program derived from the bondline thickness profile represents quantities of adhesive to be applied at respective regions of the bonding interface to fully occupy the bondline. The implementation program or procedure for the adhesive application schedule or profile depends on the kind of adhesive used. For example if liquid or paste adhesive is to be used, the schedule may be calculated in terms of a predetermined application weight per area of adhesive at respective regions of the bonding interface. The schedule calculated from the thickness profile may be used in an appropriate control program e.g. for robotic application of liquid or paste adhesive onto the bonding face of one of the components with an appropriate distribution.

We prefer to use solid film form adhesive because of ease and cleanliness of handling and because it does not tend to move around after application. With solid film adhesive the adhesive application schedule is generally implemented so as to produce a set of adhesive film pieces of predetermined shape which, when appropriately positioned at the bonding interface, will build up an adhesive thickness profile matching the bondline thickness profile. Accordingly, the method may use a film-cutting control program with algorithms appropriate to convert the bondline thickness profile to a corresponding predetermined arrangement of adhesive film pieces over the bonding interface to provide the target adhesive thickness profile. Again, standard programming may be used. The program desirably uses a series of thickness threshold values, corresponding to multiples of the thickness of the adhesive film, to approximate the stepped thickness gradation of the laminated adhesive film plies to the progressive thickness change of the actual bondline.

A cutter program which uses the predetermined calculated shapes of the adhesive film pieces (adhesive kit) to control a cutting machine to cut the corresponding pieces from adhesive film is well-known, e.g. as a .DXF file used for cutting in the laminates and textiles field, so this step is readily implemented.

The adhesive type may be selected in line with usual practice. Epoxy adhesives are often suitable.

When applying adhesive as solid film pieces, it is preferred to provide a positioning guide on the component bonding face to indicate the appropriate position for each adhesive piece. Preferred for this is a light projector, e.g. a laser projection device, which indicates position by light beam on the component surface. Such devices are known in the composite assembly art. In the context of the present method the projector can readily be controlled on the basis of the data in the adhesive application schedule, for example.

As described above the method is implemented between the first and second components which are to be bonded together. This has the great advantage of proceeding directly and efficiently towards the specification of the necessary bondline thickness profile. However, in an alternative or supplementary implementation of the idea, which may be carried out e.g. as a preliminary stage in preparing the components to be bonded, the above-described fit check may be carried out between one of the components to be bonded and a template component. The template component has a standard form corresponding to the form of the other component to be bonded. This procedure may be useful e.g. when one or both of the components to be bonded is likely to have initial substantial non-uniformity or irregularity, so that it is more efficient to approximate a component's bonding face initially to a standard form of the other component rather than to an actual form. In this implementation the fit check using the sensor layer may be done according to any of the proposals herein, and the adhesive application schedule need not be produced.

A further aspect of the present proposals is a system for implementing a bonding method as described above and including a sensor layer preform as described above and a control processor programmed to determine a bondline thickness profile based on pressure data from the sensors of the sensor layer preform, and preferably also a control processor to determine an adhesive application schedule in dependence on the bondline thickness profile and optionally control any of: a cutter to cut adhesive pieces, a positioning guide to indicate the predetermined positions for adhesive pieces on a component, an automated adhesive applicator. In a particular embodiment the preform is shaped to fit along a blade edge, e.g. a compressor fan blade edge for a ducted fan gas turbine engine.

The invention will now be described by way of example with reference to the accompanying drawings in which FIG. 1 shows an edge guard being fitted onto a compressor fan blade of a gas turbine engine, FIG. 2 being a fragmentary chordal section at II-II;

FIG. 10 shows a sensor layer preform kit suitable for use in fitting an edge guard on a fan blade as in FIGS. 1 to 4;

FIG. 11 is a fragmentary chordal section showing the sensor layer preform kit introduced between the edge guard and blade edge as they are brought together in a fit check procedure;

FIG. 12 shows schematically a laser projection guide marking application positions for shaped adhesive plies on the fan blade.

Figure 3:
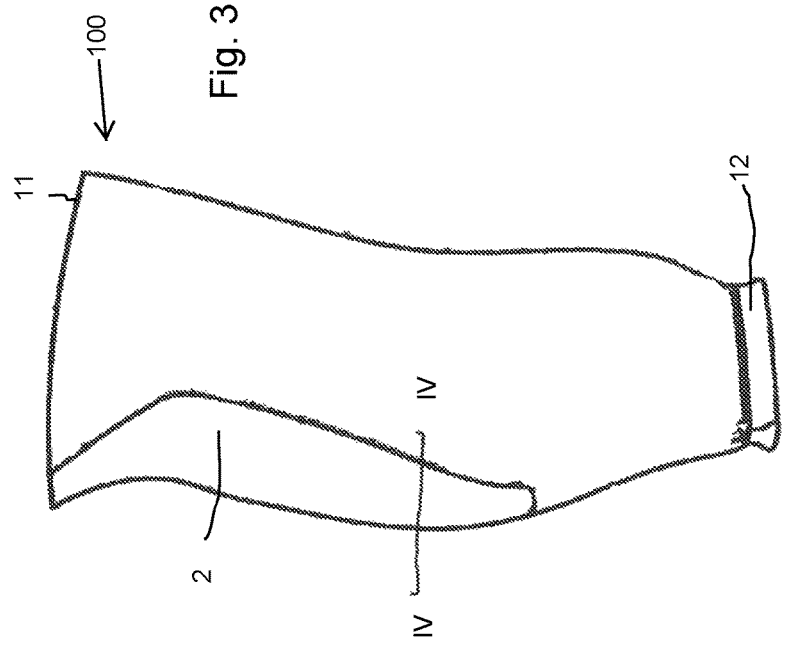
FIG. 3 shows the edge guard in position on the blade.
Figure 4:
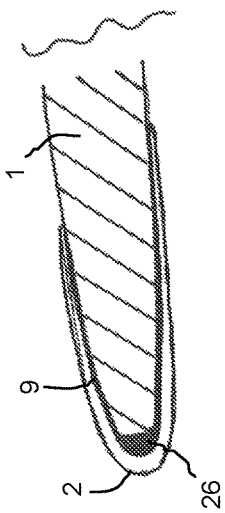
FIG. 4 is the corresponding section at IV-IV.
Figure 1:
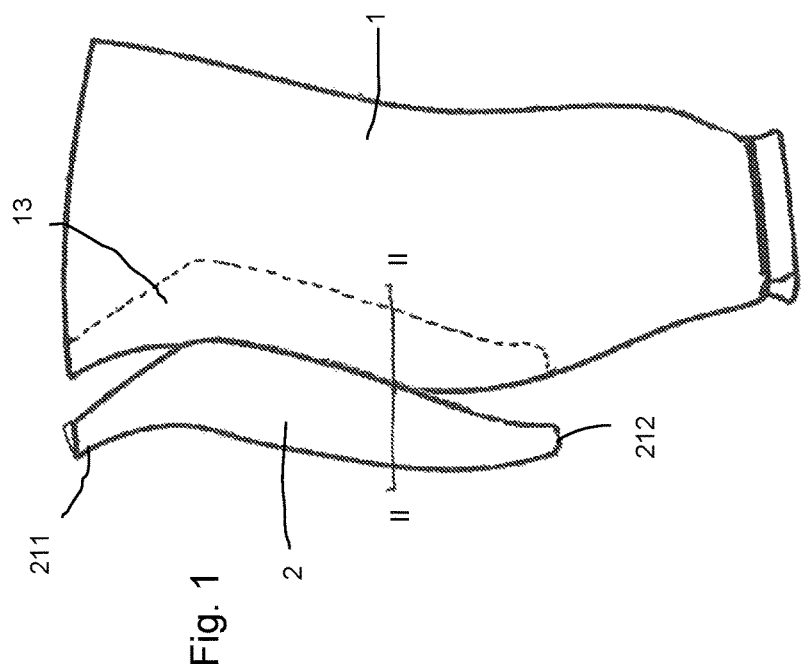
Figure 2:
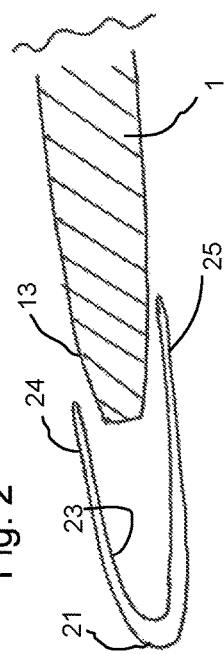

Refer first to FIGS. 1 to 4. The invention is illustrated with reference to an example of bonding the blade body 1 of a compressor fan blade 100 to a metal leading edge guard or trim 2. This is a well-known construction; the greater strength of the edge guard 2 protects the fibre composite body 1 of the blade 100 from impact damage. The edge guard 2 is in the form of an elongate channel with a tip 21, a pressure side flange 25 and a suction side flange 24 shorter than the pressure side flange. Usually it is of titanium or titanium alloy such as Ti 6-4. The fan blade 100 has a tip 11 and a root 12. In the illustrated example the edge guard 2 extends most of the way down the leading edge of the blade; it may be shorter or longer than this. It is bonded onto a bonding face 13 of the blade body 1 (see FIG. 1) by a layer of adhesive 9 (FIG. 4) which bonds to an inwardly-facing interior bonding face 23 of the edge guard (FIG. 2). With reference to the general discussion of the invention above, the blade body 1 is the first component and the edge guard the second component. The components 1,2 are of large size, of different materials which are both stiff and strong, and their respective bonding faces 13,23 approach at a steep and varying angle. It is therefore a demanding task to achieve a gap thickness that is within the permitted or desirable range for the adhesive 9, and then to ensure that the gap is filled (but not over-filled) with adhesive over substantially all of its area. In fact in this situation the extreme edge region is less critical for bonding thickness; here there may be an enlarged thickness or void region 26 as shown, filled with a larger body of adhesive and with the thickness-critical regions to either side of it.

The opposed bonding surfaces 13,23 of the blade body 1 and edge guard 2 define a bonding interface of the assembly, occupied by the adhesive 9. The shortest distance across this interface from one component face to the other is the bondline thickness. The preferred adhesive is an epoxy-based adhesive, used as a solid film provided on a release backing. A maximum bondline thickness for such an assembly away from the void region 26, that is a bondline thickness above which the adhesive becomes less effective in holding the components together, is usually about 1 mm. However, the bondline thickness may permissibly be much less, down to near-contact, without disadvantage. Accordingly it is preferred to use an adhesive film of thickness only a fraction of the maximum bondline thickness, so that the adhesive can be built up in multiple layers to approximate closely the variations in the bondline gap. Adhesive film thickness is usually between ⅒ and ⅓ of the maximum bondline thickness. In this example 0.25 mm thick thermo-setting epoxy adhesive film is used.

The edge guard 2 has location points 211,212 at its tip and root ends respectively, indicated but not specifically shown in FIG. 1. These are formed so that the blade body 1 and edge guard 2 abut at these positions when a generally suitable bondline thickness is defined between them at the bonding interface, so they provide a reference position for fit checking and bonding. This is known in itself.

Figure 5:
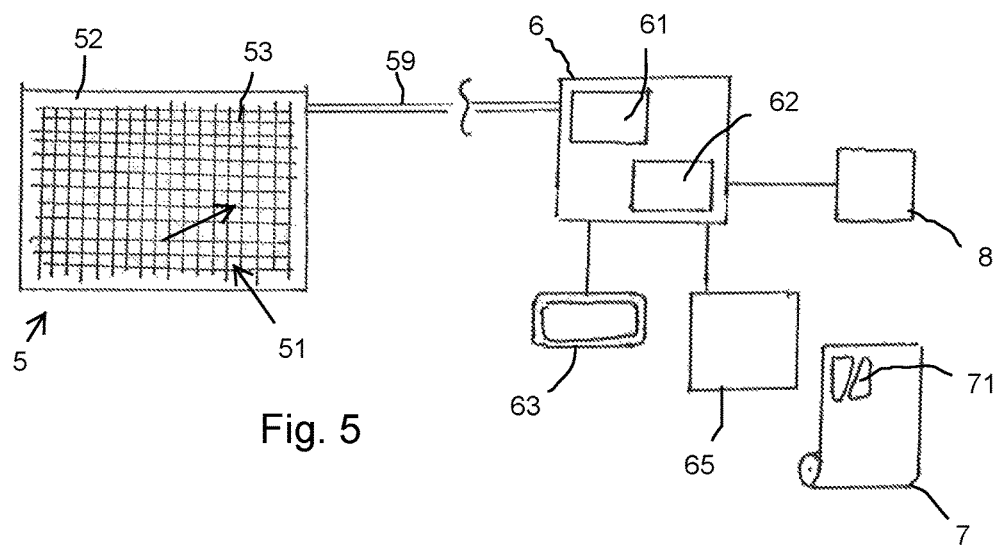
FIG. 5 is a schematic view of a sensor layer and associated equipment.

FIGS. 5 to 8 show details of a sensor layer system which is a characteristic part of the present proposals. Shown in FIG. 5 schematically as functional units are a sensor layer 5, a control processor 6, a cutter 65 for cutting adhesive film 7, a laser projection device 8 for guiding adhesive application to components and a user display 63.

The sensor layer 5 is a thin polymeric sheet or film 52 incorporating an array 51 of minute piezoelectric sensors 53. The layer 5 is flexible and the connectors for the sensors 53 run within the sheet 52 to a single master connector 59 to the control processor 6. Rectangular piezoelectric array sensor sheets of this general type are known and commercially available, e.g. from Tiedemann & Betz as mentioned above. They are available at sheet thicknesses in a wide range below 1 mm and in a variety of polymer materials. The total number and density of individual sensors can also be chosen over a wide range, with the distance between individual sensors being as high as 12 mm and as small as 1 mm according to the design needs. The total number of the sensors, usually arranged in crossing "lines", may be in the hundreds or thousands so a detailed pressure profile can be determined. Each sensor 53 gives out an electric signal proportional to the applied pressure at that point of the layer 5 and these pressure data are communicated to the control processor 6 for storage and use. A visual representation or map of the pressure variation over the layer may be presented on a display 63.

Figure 6:
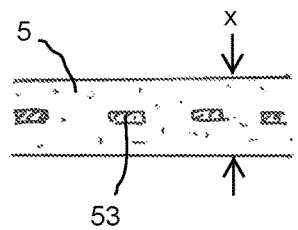
FIGS. 6, 7 and 8 are schematic sectional views of alternative forms of sensor layer.
Figure 7:
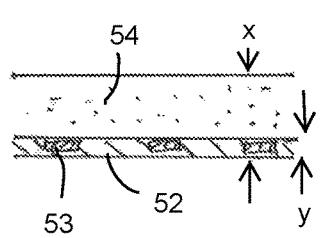
Figure 8:
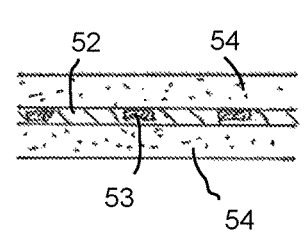

According to the present proposals a sensor layer 5 of the type shown schematically in FIG. 5 is used for measuring the bondline thickness between the bonding faces 13,23 of the blade body 1 and edge guard 2. For this purpose a sensor layer preform 55 shaped to match the form of the bondline is made up from layer material incorporating the piezoelectric sensor array, and the preform 55 is shown in FIG. 10. In this structure the thickness-critical regions of the bondline interface are the relatively flat regions to either side of the sharp edge void region 26. These can be adequately measured by individual flat sensor layer panels 552,553 for the pressure and suction faces respectively, as a kit. FIG. 10 shows by way of example these panels 552,553 made up into a single preform for ease of handling, joined by a central elastomeric connecting piece 551 without sensors which lies in the void region 26 at the blade edge during the fit check. It is also possible to use the panels separately. The panels 552,553 are tailored in outline to match the outlines of the corresponding parts of the interface between the metal guard flanges and the blade sides. Because the permissible thickness of the bondline may vary radically below the maximum, the sensor layer needs to be correspondingly compressible without destroying the sensor structures. FIG. 6 shows a simple structure in which the compressible polymer layer incorporating the array of sensors 51 is made thick relative to the layer of sensors (thickness x being the permissible bondline maximum), and the polymer being sufficiently soft to compress down to a small fraction of x where the bondline is narrow. This simple structure may be suitable in some cases, but in others the sensors 53 and their associated connectors may not be sufficiently supported. FIG. 7 shows a preferred alternative, in which a sensor layer 52 of a stronger, less deformable polymer is laminated with an extender layer 54 of a soft, easily-compressible polymer to the same total thickness x, with the sensor layer 52 occupying a thickness y which is a small fraction, less than 20%, of the total thickness x. Although the sensor layer polymer is less compressible, the extender layer 54 gives adequate compressibility to the layer 5. FIG. 8 shows another alternative in which extender layer material 54 is provided on both faces of the sensor layer 52 which is central.

Figure 9:
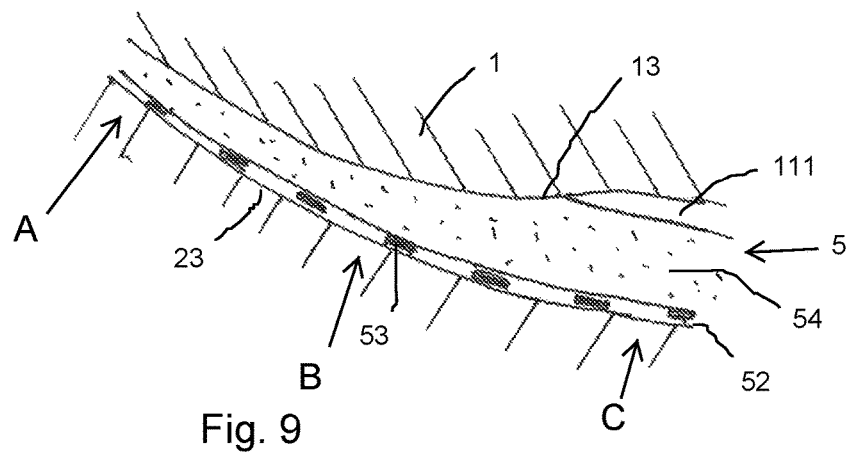
FIG. 9 shows schematically the behaviour of a sensor layer between opposed component surfaces with varying spacing corresponding to a bondline thickness.

FIG. 9 shows, in schematic cross-section, the behaviour of the sensor layer 5 between components 1,2 at the interface. The extender layer 54 is progressively compressed as bondline thickness reduces from a larger value (at B) to a smaller value (at A). As the layer progressively compresses, the pressure experienced by the piezoelectric sensors 53 progressively increases and they produce a correspondingly increased signal, so that the pressure signal from the sensors 53 correlates directly and progressively to the bondline thickness at the point concerned. If there is an excessive clearance 111 where the surfaces are spaced beyond the maximum bondline (at C)—and therefore also beyond the rest thickness x of the layer of the sensor layer 5—no compression is detected by the corresponding sensors and this would indicate an unacceptable level of non-conformity at that region.

To implement the invention, a sensor layer preform kit 55 e.g. as seen in FIG. 10 is positioned between the blade body 1 and the edge guard 2 and these are brought together (FIG. 11, arrow D) until engagement at the location points 211,212 indicates reaching the intended bonding position. The signals from the piezoelectric sensors 53 are converted to a pressure map over the bonding interface area, which may be viewed on the display 63. This pressure map correlates directly with the variation of bondline thickness over the bonding interface, i.e. the bondline thickness profile; this bondline thickness profile 61 is calculated and held or stored as indicated schematically in FIG. 5.

Further software of the control processor (it may of course be a separate operation and a separate processor in actuality) then converts the bondline thickness profile data 61 to a set of instructions corresponding to the amount or number of layers of film adhesive required to fill the bondline at each region. This calculated adhesive application schedule 62 is then used to assist the preparation of an adhesive kit for bonding the edge guard 2 onto the blade body 1.

Firstly, a programmable automated cutter 65 (indicated schematically in FIG. 5; these are well-known) is controlled in dependence on the adhesive application schedule.

For solid film adhesive of predetermined thickness, the software interprets the graduated pressure/thickness values from the sensor layer with reference to a set of threshold values corresponding to multiples of the adhesive film thickness, thereby determining the number of layers of film adhesive required to fill the bond line at each region. The result is an adhesive application schedule in the form of program instructions for a predetermined set of adhesive film shapes calculated in dependence on the bondline thickness profile, and which can be cut from a supply of adhesive film 7 by the automatic cutter 65. Some corresponding adhesive shapes are indicated schematically at 71 in FIG. 5. The result is a complete kit of adhesive pieces which can be built up, when appropriately positioned, to provide a pattern of adhesive on the blade bonding face 13 matching the predicted bondline thickness when the edge guard is in place.

Because the adhesive application schedule is in the form of stored data directly calculated from the bondline thickness profile, it is also available to assist a user to position the pieces of adhesive film 71 correctly on the blade body 1.

FIG. 12 shows a film piece 71 already in place and a laser projector device 8 indicating, by a marker 82 delineated by a beam 81, the appropriate position for a subsequent adhesive film piece.

In this way, the process of adhesive kit preparation for assembly of the blade edge guard is completely automated. The skilled person will also understand that the use of the sensor layer preform and the associated system can be used before the actual bonding stage as a means of shape checking and quality control for components to be bonded.

Figure 13:
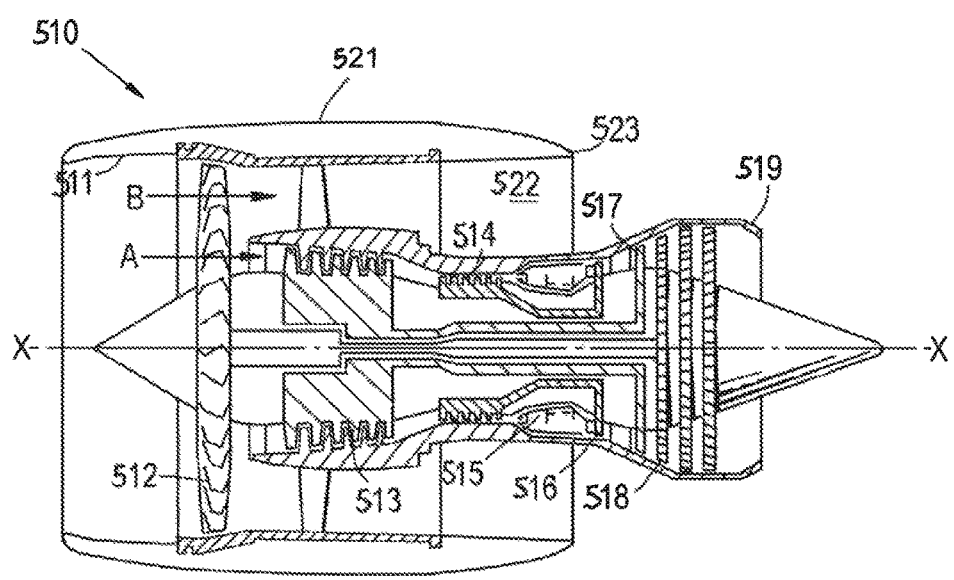
FIG. 13 is a longitudinal cross-section through a ducted fan gas turbine engine in relation to which the described methods are useful, for example in the manufacture of fan blades.

With reference to FIG. 13, a ducted fan gas turbine engine incorporating bonded components made according to the invention is generally indicated at 510 and has a principal and rotational axis X-X. The engine comprises, in axial flow series, an air intake 511, a propulsive fan 512 having a set of fan blades which may be made by the present methods, e.g. with respect to leading edge and/or trailing edge guards thereof, an intermediate pressure compressor 513, a high-pressure compressor 514, combustion equipment 515, a high-pressure turbine 516, an intermediate pressure turbine 517, a low-pressure turbine 518 and a core engine exhaust nozzle 519. A nacelle 521 generally surrounds the engine 510 and defines the intake 511, a bypass duct 522 and a bypass exhaust nozzle 523.

During operation, air entering the intake 511 is accelerated by the fan 512 to produce two air flows: a first air flow A into the intermediate-pressure compressor 513 and a second air flow B which passes through the bypass duct 522 to provide propulsive thrust. The intermediate-pressure compressor 513 compresses the air flow A directed into it before delivering that air to the high-pressure compressor 514 where further compression takes place.

The compressed air exhausted from the high-pressure compressor 514 is directed into the combustion equipment 515 where it is mixed with fuel and the mixture combusted. The resultant hot combustion products then expand through, and thereby drive the high, intermediate and low-pressure turbines 516,517,518 before being exhausted through the nozzle 519 to provide additional propulsive thrust. The high, intermediate and low-pressure turbines respectively drive the high and intermediate-pressure compressors 514, 513 and the fan 512 by suitable interconnecting shafts.

The invention claimed is:

1. A bonding method for joining first and second components by adhesive bonding at a bonding interface defined by respective complementary bonding faces of the first and second components, the method comprising a pre-bonding fit check in which the components are arranged in an intended bonding position to check the closeness of fit between them over the bonding interface, and wherein the fit check comprises:
   bringing the components together in the intended bonding position with a flexible, compressible spacing sensor layer between their bonding faces, thereby compressing the sensor layer to varying degrees according to the spacing between the faces at different regions of the bonding interface, and
   sensing the degree of compression of the sensor layer at the different regions to obtain a bondline thickness profile for the bonding interface.

2. Bonding method according to claim 1 in which the sensor layer comprises an array of piezoelectric sensors.

3. Bonding method according to claim 1 in which the sensor layer is susceptible of resilient compression at least down to 20% of its rest condition thickness.

4. Bonding method according to claim 1 in which the thickness of the sensor layer is at least 0.5 mm and not more than 2 mm.

5. Bonding method according to claim 1 in which the sensor layer is recoverably compressible at least down to 0.2 mm thickness.

6. Bonding method according to claim 1 in which the sensor layer comprises a sensor sheet incorporating an array of pressure sensors and an extender layer laminated on one or both faces of the sensor sheet, the extender layer material being softer than that of the sensor sheet; and optionally wherein the extender layer material constitutes at least 70% of the total sensor layer thickness.

7. Bonding method according to claim 1 in which the bonding interface is three-dimensionally shaped and the sensor layer is a sensor layer preform having a corresponding three-dimensional shape or a sensor layer preform kit comprising a set of shaped panels corresponding to respective correspondingly-shaped regions of the bonding interface.

8. Bonding method according to claim 1 comprising using a programmed control processor to determine an adhesive application schedule, representing the quantities of adhesive to be applied to the respective regions of the bonding interface, from the bondline thickness profile.

9. Bonding method according to claim 8 comprising using the control processor to control the amounts of adhesive applied at various regions of the bonding interface in dependence on the adhesive application schedule.

10. Bonding method according to claim 8 in which the adhesive is applied as a solid film of predetermined uniform thickness, and the adhesive application schedule determines an arrangement of pieces of the adhesive film for building up an adhesive layer corresponding in thickness to the bondline thickness profile.

11. Bonding method according to claim 10 in which the adhesive application schedule controls a cutter to cut a set of adhesive film pieces suitable to build up said adhesive layer.

12. Bonding method according to claim 10 comprising controlling an automated adhesive application guide in dependence on the adhesive application schedule to indicate on a said component the positions of application of adhesive film pieces to build up said adhesive layer.

13. Bonding method according to claim 1 in which the bonding interface is progressively curved in more than one plane.

14. Bonding method according to claim 1 in which the second component has a recess comprised in or constituting its bonding face and receiving a correspondingly projecting bonding face or bonding face portion of the first component.

15. Bonding method according to claim 1 in which the second component is a channel, cover or sheath having an interior recessed bonding face fitting onto a complementary outer edge bonding face of the first component.

16. Bonding method according to claim 1 in which one or both components is of fibre-reinforced composite.

17. Bonding method according to claim 1 in which the first component is a blade, vane or other aerofoil element and the second component is an edge cover or edge guard for it.

18. A fit check system for implementing a bonding method according to claim 7 and comprising:

the sensor layer preform or preform kit, and a control processor programmed to determine a bondline thickness profile based on pressure data from the sensors of the sensor layer preform.

19. A fit check system according to claim 18 in which the control processor is programmed to determine an adhesive application schedule in dependence on the bondline thickness profile and optionally control any of a cutter to cut adhesive pieces, a positioning guide to indicate predetermined positions for adhesive pieces on a said component, or an automated adhesive applicator.

20. A fit check system according to claim 18 in which the sensor layer preform or preform kit is shaped to fit a blade edge.

* * * * *